May 21, 1940.　　　　H. W. HEY　　　　2,201,970
GEAR SHIFTING MECHANISM FOR MOTOR VEHICLES
Filed Sept. 1, 1937　　　3 Sheets-Sheet 1

Inventor
HENRY W. HEY

May 21, 1940. H. W. HEY 2,201,970
GEAR SHIFTING MECHANISM FOR MOTOR VEHICLES
Filed Sept. 1, 1937 3 Sheets-Sheet 3

Inventor
HENRY W. HEY

Patented May 21, 1940

2,201,970

UNITED STATES PATENT OFFICE 2,201,970

GEAR SHIFTING MECHANISM FOR MOTOR VEHICLES

Henry W. Hey, Richmond, Va., assignor to Automatic Shifters, Inc., Richmond, Va., a corporation of Virginia Application September 1, 1937, Serial No. 162,051

9 Claims. (Cl. 74—335)

This invention relates to gear shifting mechanisms for motor vehicles.

There has been an increasing tendency to substitute for the manually operable gear shifting lever of a motor vehicle a power operated shifting mechanism which can be controlled from a relatively small hand lever or similar operating element which is readily accessible to the driver. Such power operated shifting mechanisms possess several quite distinct advantages which render their use desirable. For example, such a mechanism clears the floor boards of the vehicle and accordingly permits the comfortable seating of three persons in the front seat of a motor vehicle, and it renders the gear shifting operation more easily accomplished by placing the control handle closer to the operator. The control handle may be placed within easy reach of the operator's hand because of the fact that the distance of travel of the handle is only a fraction of that required for a conventional shift lever. A power operated gear shifting mechanism also has the advantage that it permits the use of a more efficient gear synchronizing means in the transmission which cannot be employed at the present time because of the substantially increased resistance which it offers against movement of a manually operated gear shift lever. This additional resistance can be readily taken care of by the power source employed in a power operated gear shifting mechanism.

Power operated gear shifting mechanisms which have been previously developed are of the "preselective" type. In other words, such mechanisms operate to prevent the actual shifting operation to take place until the vehicle clutch has been disengaged, and accordingly the manually operable lever which controls the shifting operation may be moved to a desired gear position while the vehicle is operating in a different gear position, and the shifting operation will not take place until the vehicle clutch has been disengaged. Such a mechanism is permitted to be preselective for the reason that the manual control handle is movable wholly independently of the shift rails of the transmission.

Some motor vehicle drivers prefer a preselecting gear shifting mechanism of the character referred to while many others prefer to follow conventional practice by disengaging the vehicle clutch prior to performing each shifting operation. A power shifting mechanism of the type referred to permits either method of shifting to be practiced, but the position of the manually operable handle is never any indication of the position of the shift rails and associated parts. Accordingly power shifting mechanisms of the character referred to are seriously disadvantageous, particularly when starting a vehicle from a standstill either in forward or reverse gears, since proper meshing of the gears does not always take place, and injury to the gears results when the clutch is engaged and the vehicle motor accelerated when the parts of the transmission are not completely in a gear position.

The present invention has for an important object the provision of a novel power operated gear shifting mechanism wherein the shifting operation is controlled by a manually operable handle the position of which always corresponds to the shiftable elements of the transmission as is true in a conventional manually shiftable transmission.

A further object is to provide an apparatus of the character referred to wherein the control means interposed between the manually operable handle and the shifting motor is of such character as to cause the shifting motor to instantaneously respond to movement of the manually operable handle.

A further object is to provide a differential pressure operated shifting motor having a control valve mechanism therefor arranged to pressure suspend the piston of the motor in any position in which the manually operable handle is stopped, thus providing a mechanism wherein movement of the piston of the shifting motor is instantaneously responsive to movement of the manually operable handle.

A further object is to provide a shifting mechanism wherein a follow-up valve mechanism controls the operation of the shifting motor in accordance with movement of the manually operable handle and wherein the novel features of the valve mechanism coordinate with the other elements of the apparatus to provide a particularly efficient shifting mechanism.

A further object is to provide a shifting mechanism controlled by a follow-up valve mechanism having two relatively movable valve elements adapted to assume relative neutral positions to arrest the movement of the piston of the shift motor, and wherein the valve elements, when in such relative neutral positions, afford limited communication between both ends of the shifting motor and the source of pressure differential, thus conditioning the shifting motor for instantaneous operation upon movement of the manually operable handle.

A further object is to provide a shifting mechanism controlled by a follow-up valve mechanism which functions to provide pressure suspension of the piston of the shifting motor whenever movement of the manually operable handle is arrested, and wherein the features of the valve which provide such operation also are utilized to prevent the valves from "hunting", thus causing the piston of the shifting motor to move in exact relationship to the movement of the manually operable handle.

A further object is to provide a power shifting mechanism having a pair of relatively movable control members one of which is connected to a manually operable handle, and wherein the relatively movable control members are limited as to their relative movement to prevent the manually operable handle from moving completely into a gear position in the normal operation of the apparatus unless the selected shift rail has moved completely into a corresponding gear position.

A further object is to provide a novel shifting mechanism of the character referred to wherein the actual shifting operation may be manually effected in the event of failure of the shifting motor to perform such function.

A further object is to provide a power operated shifting mechanism for use with motor vehicle transmissions having associated therewith means for selecting the desired shift rail for operation, and wherein the selection of one shift rail will take place automatically upon failure of the power mechanism, to permit such shift rail to be manually moved into a gear position.

A further object is to provide a single manually operable handle for controlling the crossing over of the shifting between the two shift rails of the transmission and for controlling the longitudinal shifting motor, and to provide means associated with the mechanism to permit the manually operable handle to partake of substantially the same forward and rearward movement when employed in connection with transmissions wherein the two shift rails move different distances.

Other objects and advantages of the invention will become apparent during the course of the following description.

In the drawings I have shown one embodiment of the invention. In this showing:

Figure 9 is a horizontal sectional view taken substantially on line 9—9 of Figure 8, and, Figure 10 is an enlarged transverse sectional view on line 10—10 of Figure 9.

Figure 1:
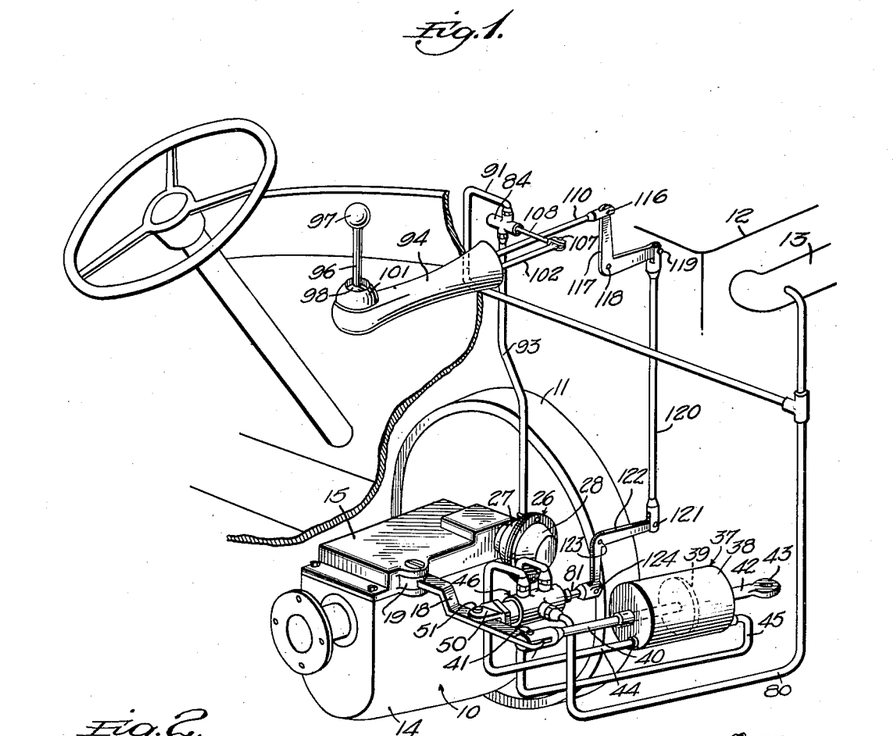
Figure 1 is a perspective view of the mechanism associated with parts of a motor vehicle, a portion of the latter being broken away.

Referring to Figure 1, the numeral 10 designates a motor vehicle transmission which may be of the conventional synchronizing type, as will become apparent. The transmission is arranged rearwardly of the usual clutch 11 by means of which power is transmitted from the rear end of a motor 12. This motor includes an intake manifold 13 which is preferably used as the source of pressure different from that of the atmosphere, for operating the shifting means to be described.

Figures 2, 3:
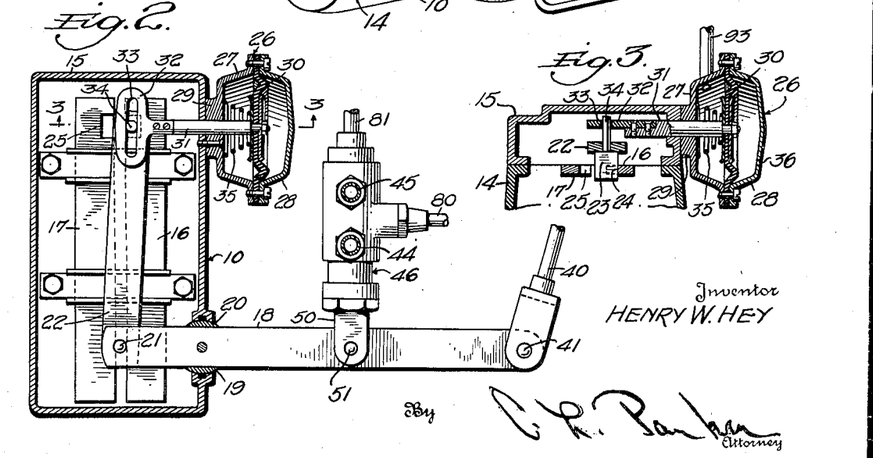
Figure 2 is a horizontal sectional view through the cover of the transmission showing the shift rail selecting and actuating mechanism, parts being shown in elevation.
Figure 3 is a detail vertical section on line 3—3 of Figure 2.

The transmission includes the usual casing 14, and in the present embodiment of the invention this casing is provided with a cover plate 15 which may support all of the mechanical elements for selecting and transmitting shifting movement to the shift rails. As shown in Figure 2, shifting of the gears is accomplished by transmitting longitudinal movement to a low and reverse gear shift rail 16 and a second and high gear shift rail 17. These elements, and the elements of the transmission shifted thereby form no part of the present invention and need not be referred to in detail.

A horizontal shift lever 18 extends laterally from one side of the transmission cover adjacent the rear end thereof, as shown in Figures 1 and 2, and is mounted in a cylindrical rocker 19 mounted in a similarly shaped opening 20 in the adjacent wall of the transmission cover, thus supporting the lever 18 for rocking movement on a vertical axis. The end of the lever 18 within the transmission is pivotally connected as at 21 to one end of a shift link 22. The other end of this link is provided with a depending lug 23 selectively engageable in notches 24 and 25 formed in the respective shift rails 16 and 17.

A crossover motor indicated as a whole by the numeral 26 is adapted to shift the lug 23 between the respective notches 24 and 25. The crossover motor includes a pair of casing sections 27 and 28, the former of which has a bearing portion 29 secured against the side of the transmission cover. A flexible diaphragm 30 is clamped between the sections of the crossover motor casing and is connected to the outer end of a slidable shaft 31. The inner end of the shaft 31 is provided with a head 32 elongated longitudinally with respect to the transmission and provided with a similarly elongated slot 33 receiving an upwardly projecting pin 34 carried by the adjacent end of the shift link 22.

Referring to Figures 2 and 3 it will be noted that a spring 35 is arranged in the casing section 27 to urge the diaphragm 30 in one direction. Movement of the diaphragm in the opposite direction is effected by connecting the casing section 27 to a source of vacuum, such as the intake manifold 13, in a manner to be described. The casing section 28 is provided with a vent opening 36 which acts when air is exhausted from the casing 27 to permit movement of the diaphragm 30 to the left as viewed in Figures 2 and 3 under which conditions the lug 23 will be arranged in the notch 25 to select the second and high gear shift rail 17 for operation. When atmospheric pressure is present in the casing 27, the biasing action of the spring 35 places the lug 23 in the notch 24, thus preparing the low and reverse gear shift rail 16 for operation.

A differential pressure motor indicated as a whole by the numeral 37 (Figure 1) is adapted to actuate the lever 18 to transmit longitudinal movement to the selected shift rail. The motor 37 comprises a cylinder 38 having a piston 39 mounted to reciprocate therein and carried by a piston rod 40, extending through one head of the cylinder. The rear end of the rod 40, as shown in Figure 1, is pivotally connected to the free end of the lever 18 as at 41. The cylinder 38 may be suitably supported to permit it to partake of the slight movement necessary to compensate for the arcuate path of travel of the pivot 41. For example, the forward end of the cylinder 38 may be provided with a supporting bar 42 having an eye 43 adapted to be pivotally connected to any suitable stationary part of the vehicle. The rear and forward ends of the cylinder 38 are adapted to be connected to the intake manifold 13 or to the atmosphere through pipes 44 and 45 respectively.

Figure 4:
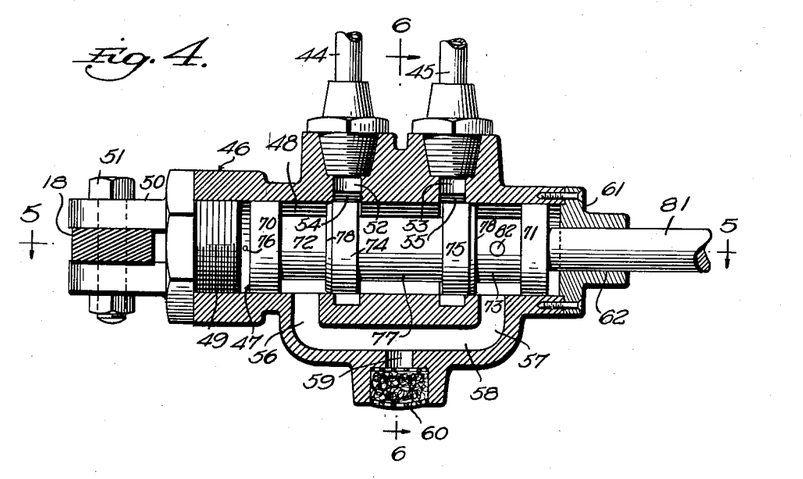
Figure 4 is a vertical longitudinal sectional view through the main valve mechanism.
Figures 5, 6:
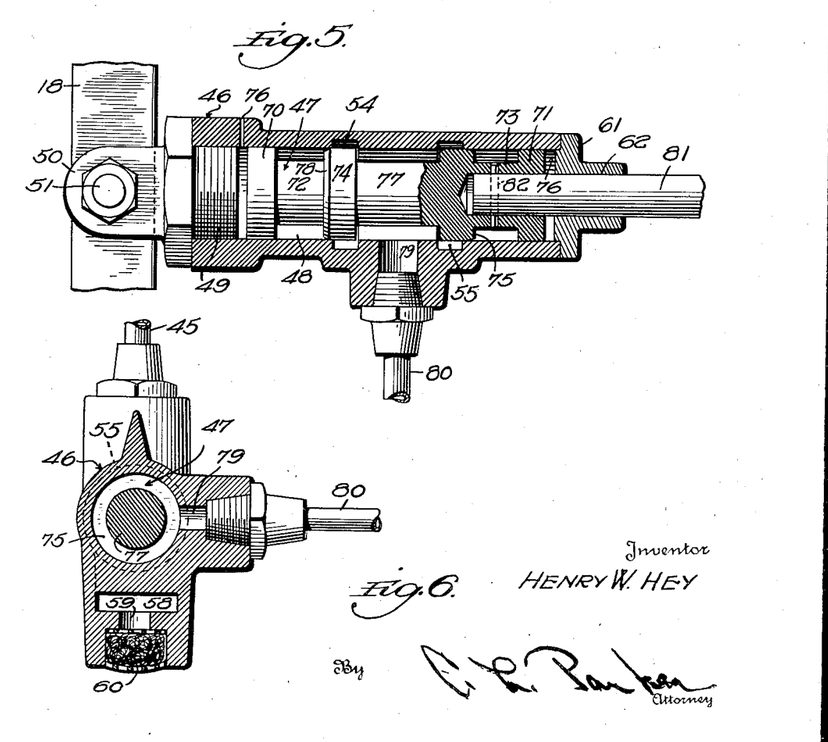
Figure 5 is a horizontal sectional view on line 5—5 of Figure 4.
Figure 6 is a transverse vertical sectional view on line 6—6 of Figure 4.

A valve mechanism for controlling the operation of the motor 37 is shown in detail in Figures 4, 5 and 6 of the drawings. This valve mechanism comprises a pair of valve elements respectively indicated as a whole by the numerals 46 and 47, the former being provided with a longitudinal bore 48 in which the valve element 47 is axially slidable. The valve element 46 has one end threaded for the reception of a plug 49 which carries a yoke 50 pivotally connected as at 51 to the lever 18. Accordingly it will be apparent that the position of the valve element 46 will be determined in accordance with the position of the lever 18. However, it will become apparent that the valve device 46 need not be connected to the lever 18 but may be connected to any element which is actuated upon movement of the piston 39.

The valve element 46 is provided with a pair of radial ports 52 and 53 communicating with annular grooves 54 and 55 respectively within the bore 48 and connected respectively to the pipes 44 and 45. The pipes referred to may be formed throughout their lengths, or through part of their lengths, of flexible relatively heavy hose, such as heavy fabric-reinforced rubber hose to permit relative movement between the valve element 46 and the cylinder 38, as will become apparent. The valve element 46 is further provided with a pair of radial ports 56 and 57 connected to each other by a passage 58 which may be cast in the body of the valve element 46, as shown in Figure 4. The passage 58 communicates with an atmospheric port 59, and this port communicates with the atmosphere through a body of air cleaning material 60.

At the end thereof opposite the yoke 50, the valve element 46 is provided with a head 61 having a bearing opening 62 to receive an operating stem through which the valve element 47 is operated, as will be described below.

The valve 47 is provided with a pair of end heads 70 and 71 slidable in the bore 48, and these heads are connected by shank portions 72 and 73 to inner spaced heads 74 and 75. The spaces within the bore 48 beyond the heads 70 and 71 are vented to the atmosphere at 76 to prevent the entrapment of air pressure within the ends of the bore, which would interfere with the free movement of the valve 47.

The heads 74 and 75 are connnected by a central shank portion 77, and the remote portions of the heads 74 and 75 are slightly tapered as at 78. Particular attention is invited to the fact that the inner limits of the heads 74 and 75 are spaced apart a distance slightly greater than the distance between the inner limits of the annular grooves 54 and 55. Accordingly when the valve elements 46 and 47 occupy the relative neutral positions shown in Figures 4 and 5, both of the pipes 44 and 45, and consequently both ends of the cylinder 38, have limited communication with the space between the heads 74 and 75. The latter space communicates with a radial port 79 (Figures 5 and 6) and this port is connected to a pipe 80 leading to the intake manifold 13, as shown in Figure 1.

An operating stem 81 is provided for the valve element 47. As shown in Figure 4 this stem has its inner end connected by a pin 82 to the valve 47, and the stem 81 is slidable in the bearing opening 62 in the head 61. The total relative movement provided between the valve elements 46 and 47 is limited, as shown in Figure 4. This limited movement is important for two reasons, which will be referred to in detail below.

Figures 7, 8:
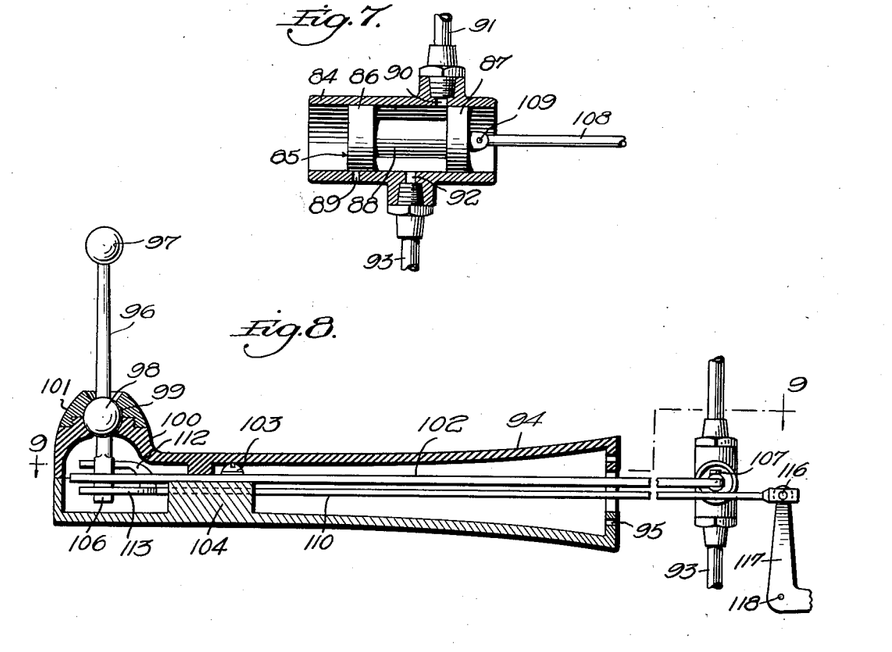
Figure 7 is a detail sectional view of the crossover control valve.
Figure 8 is a vertical longitudinal sectional view through the selector lever supporting arm, parts being shown in elevation.

A valve mechanism for controlling the operation of the crossover motor 26 is shown in Figure 7. Such mechanism comprises a valve casing 84 in which is slidable a valve 85 having spaced heads 86 and 87 connected by a shank 88. The valve casing 84 is provided with an atmospheric port 89 which is normally covered by the head 86, as will become apparent. A port 90 communicates with the interior of the valve casing 84 and is connected by a pipe 91 to the pipe 80, which leads to the intake manifold 13, as previously described. The valve casing 84 is provided with a third port 92 connected by a pipe 93 to the crossover motor casing 27. The valve 85 is normally biased to the position shown in Figure 7 by means to be described, and accordingly the crossover motor casing 27 is normally connected to the intake manifold through the ports 90 and 92.

Figures 9, 10:
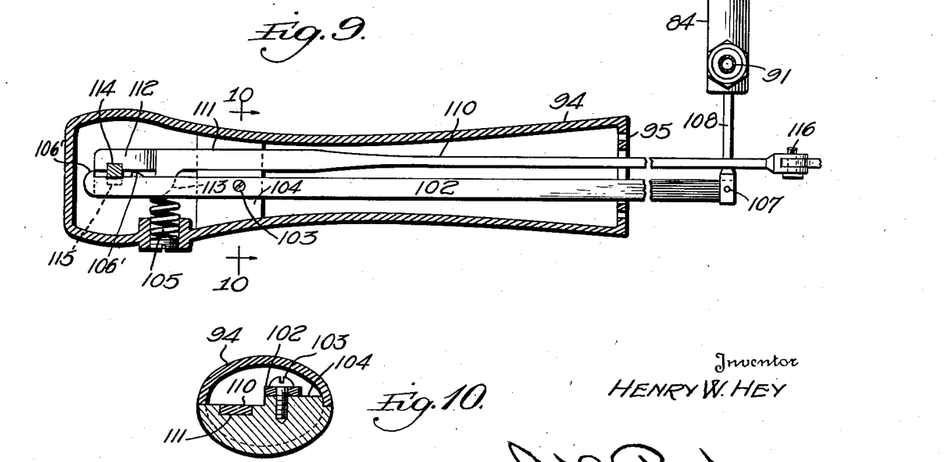

A manually operable mechanism for controlling the valve mechanisms shown in Figures 4, 5, 6 and 7 is illustrated in Figures 1, 8 and 9. A hollow arm 94 may be secured to the instrument panel of the vehicle and may extend rearwardly thereof, as shown in Figure 1. This arm may be provided with openings 95 for the reception of bolts or screws by means of which the arm 94 may be secured to the panel. As a matter of manufacturing expediency the arm 94 may be divided horizontally into complementary sections which may be secured together in any suitable manner.

A manually operable lever 96 is supported by the rear end of the arm 94 and may be provided at its upper end with a small knob 97. The lever 96 is provided with a ball 98 mounted for universal movement in a socket 99 formed in part by the upwardly extending rear end 100 of the arm 94 and in part by a cap 101 secured to the extension 100. A lever 102 is pivotally supported as at 103 upon a boss 104 formed within the arm 94, this lever accordingly turning horizontally about a vertical axis. A spring 105 engages the rear end of the lever 102 to tend to turn it in a clockwise direction as viewed in Figure 9. The rear end of the lever 102 has a straight portion bearing against the squared lower end 106 of the lever 96 and forward and rearward movement of the lower end 106 of the handle is limited by contact with lugs 106′ (Figure 9). The forward end of the lever 102 is pivotally connected as at 107 to one end of an operating stem 108, the other end of this stem being connected as at 109 (Figure 7) to the valve 85.

A bar 110 is mounted within the arm 94 and has a portion with parallel edges mounted to slide in a guide 111 formed in the arm 94 near the rear end thereof. The rear end of the bar 110 terminates in a pair of vertically offset arms 112 and 113 respectively provided in their inner edges with notches 114 and 115. These notches are adapted to selectively receive the squared lower end 106 of the lever 96. It will become apparent that when the squared end 106 is in engagement with the notch 114, second or high gear may be selected for operation, and when the squared end 106 is arranged in the notch 115, first or reverse gear may be selected. The arm 113 of the bar 110 is arranged a greater distance from the center of the ball 99 than the arm 112. Accordingly a given movement of the lever 96 transmits greater movement to the bar 110 when the squared end 106 is arranged in the notch 115 than when arranged in the notch 114, thus compensating for the greater movement which is necessary in operating the first and reverse gear shift rail 16 in most transmissions.

It will be apparent, of course, that when the arm 94 is secured to the instrument panel in the manner described, such panel will be provided with a suitable opening to permit the lever 102 and bar 110 to project therethrough. The front end of the bar 110 is pivotally connected as at 116 to one arm of a bell crank lever 117, pivotally supported intermediate its ends as at 118 in any suitable manner. The other arm of the bell crank lever 117 is pivotally connected as at 119 to the upper end of a link 120, and the lower end of this link is pivotally connected as at 121 to one arm of a bell crank lever 122. The bell crank lever is pivoted intermediate its ends as at 123 and has its other arm pivotally connected as at 124 to the forward end of the valve stem 81. Thus it will be apparent that when the lever 96 is moved forwardly and rearwardly with the lower end of the lever in one of the notches 114 or 115, movement will be transmitted through the mechanical connections referred to to the valve element 47.

The operation of the apparatus is as follows:

Assuming that the vehicle is at a standstill and the driver desires to pass through the usual sequence of gear ratios for forward movement, the clutch pedal will be depressed, whereupon the operator may move the handle 96 toward the left as viewed in Figure 1 and then rearwardly. Under such conditions, the handle 96 will occupy a position corresponding to the low gear position of a conventional gear shift lever, and the parts of the apparatus operate to provide the usual low gear ratio.

The movement of the handle 96 to the left in neutral position in the manner stated moves the lower end 106 of the handle downwardly or toward the observer in Figure 9 which operation turns the lever 102 about its pivot 103 and at the same time arranges the lower end of the handle in the notch 115. The movement transmitted to the lever 102 moves the valve stem 108 upwardly as viewed in Figure 9 or to the left as viewed in Figure 7, and this operation causes the valve head 87 to cover the vacuum port 90, while the valve head 86 moves to the left of the port 89, thus admitting air into the port 92. This port communicates through the pipe 93 with the interior of the crossover motor casing 27 (Figures 2 and 3) and accordingly atmospheric pressure will be established on opposite sides of the diaphragm 30. The spring 35 thus will move the shaft 31 to the right as viewed in Figures 2 and 3, and the head 32 will move the pin 34 to the right to place the lug 23 (Figure 3) in the notch 24.

Obviously the shift link 22 (Figure 2) is free to swing about the pivot 21 to permit the lug 23 to be arranged in the notch 24 in the manner stated, and thus the low and reverse gear shift rod is selected for actuation upon transverse movement of the handle 96 in the manner stated. Rearward movement of the handle 96 will then cause the main valve mechanism to establish differential pressures in opposite ends of the cylinder 38 to effect movement of the shift rail 16 in accordance with the movement of the handle 96. As previously stated, the inner limits of the valve heads 74 and 75 (Figures 4 and 5) are spaced apart a distance slightly greater than the inner limits of the annular grooves 54 and 55. Moreover, the remote portions of the valve heads 74 and 75 are slightly tapered so that initial movement of the valve 47 will connect one or the other of the ports 54 or 55 to the atmosphere. Upon initial rearward movement of the handle 96, the bar 110 will rock the bell crank lever 117, thus moving the link 120 downwardly. This action rocks the bell crank lever 122 whereby the lower arm of this lever will move the valve stem 81 rearwardly. Initial rearward movement of the valve stem 81 causes the valve 47 to move slightly to the left of the position shown in Figures 4 and 5, whereupon the valve head 74 will slightly increase communication between the annular groove 54 and the vacuum space between the valve heads 74 and 75, this space being connected to the intake manifold through port 79 (Figure 5) and pipe 80. At the same time, movement of the valve head 75 will close the slight communication which previously existed between the annular groove 55 and the vacuum space between the valve heads, and will establish communication between the groove 55 and the atmospheric space to the right of the valve head 75 in Figure 4. In this connection it will be noted that the two spaces beyond the remote limits of the valve heads 74 and 75 both communicate with the atmosphere through ports 56 and 57, passage 58 and port 59.

Thus it will be apparent that initial movement of the valve 47 in the manner described slightly increases the degree of communication between the pipe 44 and the intake manifold and establishes communication between the pipe 45 and the atmosphere. The latter pipe communicates with the forward end of the cylinder 38 while the pipe 44 communicates with the rear end of the cylinder, and accordingly it will be apparent that the piston 39 will start to move rearwardly. This operation rocks the lever 18 in a clockwise direction as viewed in Figure 2 and transmits forward movement to the shift rail 16 through the shift link 22.

As the handle 96 is moved progressively rearwardly, approximately the same degree of communication will be maintained between the pipe 44 and the source of vacuum and between the pipe 45 and the atmosphere since the valve element 46 is connected to the lever 18 and accordingly moves rearwardly with the outer end of this lever. In other words, the valve element 46 moves in the same direction as the valve element 47 and maintains a position slightly in advance of a neutral position with respect to the valve 47 so long as the rearward movement of the handle 96 continues. Assuming that movement of the handle 96 should be arrested at any point, it will be apparent that very slight movement of the valve element 46 with respect to the valve element 47 would reestablish the relative neutral positions of the valve elements. Under such conditions, the valve head 75 would close communication between the groove 55 and the atmosphere and would reestablish restricted communication between the groove 55 and the vacuum space between the valve heads 74 and 75. Thus air will be exhausted from the forward end of the cylinder 38 and movement of the piston 39 will be arrested. In other words, upon the stopping of the movement of the handle 96, the piston 39 will be promptly "vacuum suspended" that is, equal vacuum will be established on opposite sides of the piston 39, and this feature of the apparatus is of extreme importance as will become apparent.

Assuming that the handle 96 is moved continuously from the neutral position to the low gear position, the piston 39 will similarly move continuously, the valve element 46 maintaining a position slightly in advance of the valve element 47 to continue the admission of air into the forward end of the cylinder 38 and the exhaustion of air from the rear end thereof. Rearward movement of the upper end of the handle 96 is limited by engagement of the lower end 106 with the forward lug 106' and such position of the lever 96 is the low gear position thereof. When such position is reached, movement of the valve element 47 to the left as viewed in Figure 4 will be arrested, and accordingly the piston 39 of the shifting motor can only move a further distance sufficient to restore the relative neutral positions of the valve elements, whereupon the vacuum suspension of the piston 39 will be effected in the manner described. When the piston 39 reaches such position, the shift rail 16 will be in the low gear position, whereupon the conventional clutch and accelerator operations may be performed to start the vehicle in motion.

When the vehicle has attained sufficient momentum in low gear, the clutch pedal may be depressed whereupon the operator may move the handle 96 forwardly to neutral position, to the right in such position and then forwardly into the second gear position, exactly in accordance with the conventional operation of the usual gear shift lever. As previously stated, the piston 39 will have been vacuum suspended in the low gear position at the rear end of the cylinder 38, and upon initial forward movement of the handle 96, air will be admitted into the rear end of the cylinder 38 to effect forward movement of the piston 39. It has been found that greater rapidity of action of the piston 39 may be accomplished by vacuum suspending the piston and then admitting air into one end of the cylinder than can be obtained by arresting movement of the piston with atmospheric pressure present on both sides thereof and exhausting air from one end of the cylinder.

When the handle 96 is moved forwardly from the low gear position the bar 110 will move rearwardly, thus turning the bell crank lever 117 in a counter-clockwise direction to pull upwardly on the link 120. This operation swings the bell crank lever 122 in a counter-clockwise direction and accordingly the valve stem 81 will be moved forwardly or to the right as viewed in Figure 4. The valve element 47 accordingly will be moved forwardly of its neutral position with respect to the valve element 46. Initial forward movement of the valve element 47 will cause the head 74 to close communication between the groove 54 and the vacuum space between the valve head 74 and 75 and will slightly open communication between the groove 54 and the atmosphere. At the same time, the valve head 75 will uncover the groove 55 to the vacuum space to a slightly increased extent, and accordingly the forward end of the cylinder 38 will remain in communication with the intake manifold while air will be admitted into the rear end of the cylinder.

The piston 39 accordingly will start to move forwardly, the rate of movement of this piston being proportionate to the rate and distance of movement of the valve element 47. Movement of the valve element 47, in turn, is dependent upon movement of the handle 96, and forward movement of this handle will be arrested in neutral position while the handle is being moved to the right to transfer the shift from the shift rail 16 to the rail 17. When forward movement of the handle 96 is arrested, the piston 39 will move a very slight distance forwardly and will transmit similar movement to the valve element 46 to restore the latter to its neutral position with respect to the valve element 47. When such position of the valve elements is reached, both ends of the cylinder 38 will be connected to the intake manifold in the manner described and the piston 39 will remain motionless, with vacuum present on both sides thereof, pending further forward movement of the handle 96 after the crossover operation has been completed.

The transferring of the shift from the rail 16 to the rail 17 is accomplished by movement of the handle 96 to the right in neutral position. Under such conditions, the lower end 106 of the handle 96 will move upwardly or away from the observer in Figure 9, thus being transferred from the notch 115 to the notch 114. At the same time, the spring 105 will urge the adjacent end of the lever 102 in the same direction, maintaining it in contact with the lower end 106 of the handle. Thus the lever 102 will turn slightly in a clockwise direction as viewed in Figure 9, and the valve 85 will be restored to the position shown in Figure 7.

With the crossover valve 85 in the position referred to, the atmospheric port 89 will be closed and the ports 90 and 92 will be in communication to connect the casing 27 of the crossover motor to the intake manifold. Thus air pressure in the casing 28, operating against the diaphragm 30, will move the shaft 31 to the left as viewed in Figure 2, and the head 32 will swing the shift link 22 to transfer the lug 23 (Figure 3) to the notch 25. Accordingly the second and high gear shift rail 17 will be selected for operation.

The operator may now move the handle 96 forwardly into second gear position. Initial forward movement of the handle 96 moves the valve element 47 forwardly, or to the right as viewed in Figure 4, in which case the valve head 74 will close communication between the annular groove 54 and the vacuum space and will open it to the atmosphere through port 56. Partial vacuum having existed to an equal extent in both ends of the cylinder 38 when the piston 59 was in neutral position, the admission of air into the pipe 44 and into the rear end of the cylinder 38 causes immediate forward movement of the piston, and this piston will continue to move forwardly so long as corresponding movement of the handle 96 takes place. The movement of the handle 96 may be continued forwardly until the lower end 106 of the handle contacts with the rear lug 106', thus preventing further forward movement of the handle. The lug 106' referred to is arranged in such position that it will arrest movement of the handle 96, and consequently movement of the valve element 47, just prior to the point at which the piston 39 reaches the full second gear position. In other words, the piston 39 is permitted to move a sufficient additional distance to restore the relative neutral positions of the valve elements 46 and 47 whereby both ends of the cylinder 38 will again be placed in restricted communication with the intake manifold to vacuum suspend the piston.

After the vehicle has attained sufficient momentum in second gear, the handle 96 may be moved rearwardly into the conventional high gear position, in which case the operation of the parts will be the same as for low gear, except that the crossover motor will be unaffected and the lug 23 will remain in engagement with the notch 25 of the second and high gear shift rail 17.

The shift into reverse will be apparent from the foregoing description, the motor 37 functioning in the same manner as for second gear. However, the handle 96 will be moved to neutral position, and then to the left before being moved forwardly into reverse gear position, and accordingly the casing 27 of the crossover motor will be opened to the atmosphere when the handle 96 is moved to the left. Thus the spring 35 will transfer the shift lug 23 to the notch 24 of the shift rail 16, and accordingly the continued movement of the piston 39 after the crossover operation has taken place, will place the gear set in reverse gear.

The spacing of the inner limits of the valve heads 74 and 75 a distance apart slightly greater than the distance between the inner limits of the annular grooves 54 and 55 is highly important. Whenever movement of the handle 96 is stopped, regardless of its position, the valve member 46 immediately assumes a neutral position with respect to the valve member 47, under which condition both ends of the cylinder 38 will be immediately connected to the intake manifold to vacuum suspend the piston 39. Consequently subsequent movement of the lever 96, regardless of the direction of movement, will admit air into one end of the cylinder 38 to cause movement of the piston 39 substantially instantaneously. The response of the piston to movement of the handle 96 is far more rapid than would be possible by the air balancing of the piston 39 and the subsequent exhaustion of air from one end thereof. Accordingly the movement of the piston 39, and consequently the movement of the selected shift rail, takes place simultaneously with the movement of the handle 96 without any lagging or sluggishness.

The porting of the main valve mechanism is important for the additional reason that it permits the minimizing of the relative movements of the valves 46 and 47 to establish differential pressure on opposite sides of the piston 39. Accordingly lost motion between the valves 46 and 47 is almost completely eliminated, it being possible in actual practice to limit this lost motion to a negligible amount such as 1/32". Accordingly, when shifting gears, the operator has no sensation whatever of the shifting of the gears lagging behind the movement of the handle 96.

The arrangement of the valve heads 74 and 75 with respect to the grooves 54 and 55 also assists in improving the operation of the valve mechanism by preventing "hunting." It will be apparent that when movement of the valve element 47 is stopped and the valve element 46 approaches a neutral position with respect thereto, one of the grooves 54 or 55 will open slightly to the vacuum space around the stem 77 before the exact neutral position is reached. Air will be progressively exhausted from the corresponding end of the motor cylinder 38, thus tending to overcome the inertia of the piston 39 which would tend to cause the piston to carry the valve element 46 beyond its neutral position with respect to the valve element 47.

In other words, it will be apparent that if the adjacent edges of the valve heads 74 and 75 were spaced apart a distance equal to the distance between the adjacent limits of the ports 53 and 54 the valve, when returning to neutral position, would not disconnect the ends of the cylinder 38 from the atmosphere and the intake manifold until the exact neutral position were reached. At such exact position, differential pressures would still exist in opposite ends of the cylinder 38, thus causing the piston to move past the desired position due both to the presence of differential pressures and to the inertia of the moving parts. With the arrangement shown, the port 52 or 53 which has been connected to the atmosphere will be disconnected therefrom and progressively connected to the source of vacuum before the neutral positions of the valves are reached. Thus there will be a progressive reduction in the differential pressures affecting the piston 39, and the pressures will be equalized when the neutral position of the valve elements is reached. Thus there will be no differential pressures tending to carry the moving parts beyond the desired positions. At the same time, it will be apparent that the exhaustion of air from one end of the cylinder 38 as the valve elements approach neutral position reduces the forces acting against the piston 39, thus permitting the inertia of the parts to diminish as the neutral position of the valve is approached, it being found in practice that the inertia has been reduced approximately to zero when the neutral position of the valve element is reached. Thus the piston is prevented from moving beyond the point predetermined by the position of the handle 96, and "hunting" of the valve mechanism is eliminated.

If the inner limits of the valve heads 74 and 75 coincided with the inner limits of the grooves 54 and 55 when the valve elements were in neutral position, it will be apparent that the neutral position would be reached with atmospheric pressure present in one end of the cylinder 38 and partial vacuum in the other end. Accordingly it would be necessary for the valve element 46 to overrun its relative neutral position with respect to the valve 47 in order to balance the pressures on opposite sides of the piston 39. As a matter of fact, overbalancing would take place and the valve element 46 would move back and forth past the exact neutral point with respect to the valve 47 several times before it would come to rest in neutral position, and this disadvantageous operation would destroy the accuracy with which the gear shifting operation follows the movement of the handle 96.

The arrangement of the valve heads 74 and 75, therefore, provides vacuum suspension of the piston 39, and also assists in promptly and accurately stopping the piston 39 when movement of the handle 96 is stopped.

It will be noted that the present device includes normally inoperative instrumentalities for providing direct manual actuation of the lever 18 upon failure of the motor 39, such instrumentalities also functioning to prevent the handle 96 from moving completely into a gear position unless the proper shift rail is moved into a corresponding position. Referring to Figure 4 it will be noted that the ends of the valve 47 are spaced only relatively slight distances from the plug 49 and head 61. As previously stated, only slight movement of the valve elements 46 and 47 is required during the normal operation of the apparatus, and such relative movement is slightly shorter than the distance through which the valve 47 is adapted to move in either direction before contacting with the plug 49 or head 61. The limit of movement of the valve 47 is not reached during the normal operation of the apparatus because of the extremely rapid response of the motor piston 39 to operation of the valve 47.

However, assuming that the power shifting means should fail for any reason, it is possible to shift into first or reverse gears by the manual operation of the handle 96 by virtue of the limited movement provided between the valve elements 46 and 47. In this connection it will be noted that the spring 35 of the crossover motor biases the shift lug 23 into engagement with the low and reverse gear shift rail 16. Upon failure of power, therefore, the low and reverse gear shift rail will be automatically selected for actuation and by using relatively substantial force, the operator may move the handle 96 forwardly or rearwardly to slide the shift rail 16 into one of its gear positions. It is particularly pointed out that the biasing spring 35 provides means independent of the energization of the crossover motor for selecting the shift rail 16 for actuation. In the event of failure of power, the spring 35 insures against the rail selecting finger 23 (Figure 3) stopping in a position bridging between the notches 24 and 25, the spring 35 positively moving the finger 23 into engagement with the notch 24 of the low and reverse gear shift rail.

The operation of manually shifting one of the shift rails is possible due to the limited relative movement between the valve elements 46 and 47, operation of the valve stem taking up play between the valve elements after which the motion of the valve stem 81 will be transmitted to the lever 18 to shift the gears. This is particularly important in cases where the vehicle battery has become discharged and it is necessary to place the vehicle in gear in order to start the motor by towing or pushing the vehicle. Such operation is impossible with other power operated gear shifting mechanisms. Moreover, due to the limited movement between the valve elements 46 and 47, it will be apparent that when the vehicle is standing still and proper gear meshing does not take place upon movement of the handle 96, such handle may be moved only until play is taken up between the valves 46 and 47. Under such conditions, therefore, the handle 96 cannot be moved fully into a gear position as is true with the preselective power shifting mechanisms referred to, and the condition of the gears thus is indicated to the driver. Following customary practice, therefore, the operator may return the handle 96 to neutral position and then release and depress the clutch pedal, whereupon shifting may take place in the manner described. The feature referred to prevents the stripping of gears or the damaging of the synchronizing clutches of synchronizing transmissions which occasionally takes place with preselecting power shifting mechanisms. As previously stated, the position of the manual control handle of such a mechanism is no indication whatever of the position of either of the shift rails of a transmission.

In many vehicle transmissions, only the gears controlled by the second and high gear shift rail are synchronized, and accordingly such shift rail does not move as far on opposite sides of neutral position as is true of the low and reverse gear shift rail. In the present construction, the handle 96 moves simultaneously with the piston 39, and in order to minimize the movement of the handle 96 when shifting the low and reverse gear shift rail 16, the bar 110 is provided with the offset ends 112 and 113. The end 113 is engaged by the lever end 106 for low and reverse gears and is further from the center of the ball 98 than the offset end 112. Accordingly a given movement of the lever 96 when engaging the end 113 will effect greater movement of the bar 110 than when the lever end 106 engages the offset end 112. Thus the offsetting of the ends 112 and 113 compensates for the difference in the distances of travel of the piston 39 according to the movement of the selected shift rail, and with transmissions of the character referred to the parts may be designed so that the handle 96 moves the same distance forwardly and rearwardly for any gear position. It will be apparent that the lever end 106 is selectively engageable in the notches 114 and 115. Since these notches are unequally spaced from the center of the ball 98, it will be obvious that the lever 96 cannot be moved when the lever end 106 bridges across between both notches 114 and 115, it being necessary for the lever to be moved completely out of one notch and into the other before movement of the lever can take place.

The movement of the handle 96 is limited by engagement of the lower end 106 against the lugs 106'. These lugs are so positioned as to stop the movement of the handle 96 slightly before a gear position is fully reached so as to permit the piston 39 to move the slight additional distance necessary to complete the last increment of movement of the gear shifting operation, and to place the valve elements 46 and 47 in their relative neutral positions with the piston 39 vacuum suspended and thus prepared for the next gear shifting operation.

Compared to other types of proposed power shifting mechanisms, the present apparatus is characterized by its extreme simplicity and the apparatus may be relatively cheaply constructed. It is particularly practicable for use as a gear shifting mechanism for motor vehicles because of the accuracy of the operation of the apparatus, the instantaneous response of the motor piston 39 causing the movement of the selected shift rail to substantially exactly coincide with the corresponding movement of the handle 96. It is also particularly noted that the apparatus may be operated without the necessity for an operator having to learn to perform any operation which is in any way different from a conventional shift.

The use of the apparatus as a gear shifting mechanism for motor vehicles further permits the floor boards to be completely cleared whereby three persons may occupy the front seat of the vehicle without inconvenience and without interfering with the operation of the handle 96. In this connection it is noted that conventional gear shift levers partake of substantial forward and rearward movement at their upper ends and since it is the practice to locate such levers sufficiently close to the driver to permit him to operate the shift lever without unnecessary inconvenience, such a lever interferes with the seating of three persons in the front seat of the vehicle due to the position of the lever in first and high gears. With the present invention the handle 96 partakes of very limited forward and rearward movement and the nature of the apparatus permits the handle to be arranged as close to the driver as is desirable. Thus the handle 96 may be very easily reached by the driver, and only slight forward and rearward movement of the handle is necessary to perform the necessary gear shifting operations. Accordingly the present apparatus materially increases the facility with which the gear shifting operations may be performed.

The invention has been specifically described for use in connection with a conventional three forward speed and reverse automobile transmission and the specific embodiment of the invention illustrated is particularly adapted for such use. However, it will be readily apparent that the apparatus is adapted for use in connection with various other types of shiftable transmissions whether stationary or in vehicles. For example, the invention readily may be used in connection with marine forward and reverse type transmissions as well as with other types of automotive and stationary transmissions, as will be apparent to those skilled in the art.

As previously stated, the motor piston 39 is vacuum suspended, or more broadly pressure suspended, when the valves 46 and 47 are in their relative neutral positions. Accordingly the apparatus clearly distinguishes from prior types of fluid pressure operated shifting mechanisms wherein the pistons of the shifting motors are stopped with atmospheric pressure on both sides of the piston. Where the term "pressure suspended" is employed in the claims, it is understood that this expression is intended to mean that pressures are equalized on opposite sides of the piston and that such pressures are different from atmospheric pressure.

Reference is made to applicant's prior Patent No. 2,180,330, issued November 14, 1939.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. The combination with a gear shifting mechanism for a motor vehicle transmission having a pair of shift rails, comprising means connected and arranged for selecting a shift rail for actuation, a motor connected for actuating the selected shift rail, a pair of respectively rectilinearly movable and pivoted control members arranged adjacent and parallel to each other, one of said members being connected to control said motor and the other member being connected to control said selecting means, and a common operating handle for said pair of members.

2. A gear shifting mechanism for a motor vehicle transmission having a pair of shift rails, comprising an element selectively engageable with said shift rails and movable to actuate the selected shift rail, a fluid pressure motor for engaging said element with a selected shift rail, a fluid pressure motor for actuating said element to move the selected shift rail, a valve mechanism for the first named motor, a valve mechanism for the second named motor, a pivoted control member for said first named valve mechanism, a rectilinearly movable control member for the second named valve mechanism provided with a pair of oppositely notched offset ends, and a control lever having a portion selectively engageable in the notches of said offset ends to move said rectilinearly movable control member upon movement of said lever in one direction, said lever being engageable with said pivoted control member to operate it upon movement of said lever in a different direction.

3. A gear shifting mechanism for a motor vehicle transmission having a pair of shiftable elements each movable in opposite directions from a neutral position, comprising means connected and arranged for selecting a shiftable element for actuation, a fluid pressure motor connected for actuating the selected shiftable element in either direction from its neutral position, a follow-up valve mechanism connected to control said motor, a pair of respectively rectilinearly movable and pivoted control members, one of said members being connected to control said selecting means, said motor and the other of said members having operative connection with said valve mechanism wholly independently of said selecting means whereby said valve mechanism causes said motor to partake of a follow-up action with respect to said other member, and a common operating handle having mechanical connection with said control members.

4. A gear shifting mechanism for a motor vehicle transmission having a pair of shiftable elements, comprising a selecting element selectively engageable with said shift rails and movable to actuate the selected shift rail, a fluid pressure motor for engaging said selecting element with a selected shift rail, a fluid pressure motor for actuating said selecting element to move the selected shift rail, a valve mechanism connected to control the first named motor, a follow-up valve mechanism connected to control the second named motor, a pair of respectively rectilinearly movable and pivoted control members one of which is connected to control said first named valve mechanism, said second named motor and the other of said members having operative connection with said follow-up valve mechanism whereby the latter causes said second named motor to partake of a follow-up action with respect to said other member, and a common operating handle having mechanical connection with said control members.

5. A gear shifting mechanism for a motor vehicle transmission having a pair of shiftable elements each movable in opposite directions from a neutral position, comprising means operable for selecting said shiftable elements for actuation, a mechanism for rendering said selecting means operative for selecting a shiftable element, a fluid pressure motor for actuating the selected shiftable element in either direction from its neutral position, a follow-up valve mechanism connected to control said motor, and a manually operable mechanism comprising a pair of portions one of which is mounted for rectilinear movement and the other of which is mounted for rocking movement, one of said portions being operative to control said first named mechanism and the other of said portions being connected to said follow-up valve mechanism, said motor having operative connection with said valve mechanism wholly independently of said first named mechanism whereby said valve mechanism causes said motor to partake of a follow-up action with respect to the last named portion of said manually operable mechanism, and a common operating handle mounted to partake of two different movements for respectively mechanically operating said portions of said manually operable mechanism.

6. In combination with a motor vehicle transmission having a pair of shiftable elements for providing different gear ratios, a selecting mechanism for selecting the shiftable elements for operation, an actuating mechanism operable separately from said selecting mechanism for actuating the selected shiftable element, a fluid pressure motor connected to said actuating mechanism wholly separately from said selecting mechanism, a floating valve mechanism comprising a pair of valve members each of which is movable, and a manually operable mechanism comprising a single operating handle connected to effect operation of said selecting mechanism and mechanically connected to one of said valve members, the other of said valve members having mechanical connection with said motor to be operated thereby wholly independently of said selecting mechanism whereby said motor partakes of a follow-up action with respect to said manually operable mechanism.

7. In combination with a motor vehicle transmission having a pair of shiftable elements for providing different gear ratios, a selecting mechanism for selecting the shiftable elements for operation, an actuating mechanism operable separately from said selecting mechanism for actuating the selected shiftable elements, a fluid pressure motor connected to said actuating mechanism wholly separately from said selecting mechanism, a floating valve mechanism comprising a pair of valve members each of which is movable, and a manually operable mechanism comprising a handle movable in two directions, means connected to utilize one movement of said handle to effect operation of said selecting mechanism, and means mechanically connected to one of said valve members for transmitting the other movement of said handle to such valve member wholly independently of said last named means, the other valve member having mechanical connection with said motor to be moved thereby wholly independently of said selecting mechanism whereby said motor partakes of a follow-up action with respect to said handle when the latter partakes of said last named movement.

8. In combination with a motor vehicle transmission having a pair of shiftable elements each movable in opposite directions from a neutral position for providing different gear ratios, a selecting mechanism for selecting the shiftable elements for operation, an actuating mechanism operable separately from said selecting mechanism for actuating the selected shiftable element, a fluid pressure motor connected to said actuating mechanism to move the selected shiftable element in either direction from its neutral position, a floating valve mechanism comprising a pair of valve members each of which is movable, a pair of respectively rectilinearly movable and pivoted control members one of which is connected to control said selecting mechanism, said motor and the other control member being respectively connected to said valve members wholly independently of said selecting mechanism whereby said motor is caused to partake of a follow-up action with respect to the last named control member, and a common operating handle having mechanical connection with said control members.

9. In combination with a motor vehicle transmission having a pair of shiftable elements each movable in opposite directions from a neutral position for providing different gear ratios, a selecting mechanism for selecting the shiftable elements for operation, an actuating mechanism operable separately from said selecting mechanism for actuating the selected shiftable element, a fluid pressure motor connected to said actuating mechanism to move the selected shiftable element in either direction from its neutral position, a floating valve mechanism comprising a pair of valve members each of which is movable, and a manually operable mechanism comprising a pair of portions one of which is mounted for rectilinear movement and the other of which is mounted for rocking movement, and a common operating handle mounted to partake of two different movements for respectively mechanically operating said portions of said manually operable mechanism, one of such portions being connected to operate said selecting mechanism, said motor and the other of said portions being respectively connected to said valve members wholly independently of said selecting mechanism whereby said motor is caused to partake of a follow-up action with respect to the last named portion of said manually operable mechanism.

HENRY W. HEY.